United States Patent
Mayer

(10) Patent No.: US 9,789,862 B2
(45) Date of Patent: Oct. 17, 2017

(54) BRAKING SYSTEM AND METHOD FOR REGULATING A PRESSURE OF A BRAKE MEDIUM IN A BRAKING SYSTEM

(75) Inventor: Jochen Mayer, Giengen an der Brenz (DE)

(73) Assignee: ROBERT BOSCH GMBH, S (DE)

( * ) Notice: Subject to any disclaimer, the term of this patent is extended or adjusted under 35 U.S.C. 154(b) by 876 days.

(21) Appl. No.: 13/985,725

(22) PCT Filed: Dec. 20, 2011

(86) PCT No.: PCT/EP2011/073378
§ 371 (c)(1),
(2), (4) Date: Nov. 4, 2013

(87) PCT Pub. No.: WO2012/110145
PCT Pub. Date: Aug. 23, 2012

(65) Prior Publication Data
US 2014/0047829 A1 Feb. 20, 2014

(30) Foreign Application Priority Data

Feb. 15, 2011 (DE) .................. 10 2011 004 140

(51) Int. Cl.
*B60T 11/00* (2006.01)
*B60T 11/10* (2006.01)
(Continued)

(52) U.S. Cl.
CPC ............... *B60T 11/103* (2013.01); *B60T 1/10* (2013.01); *B60T 8/4872* (2013.01);
(Continued)

(58) Field of Classification Search
CPC ................................. B60T 8/4216; B60T 8/44
See application file for complete search history.

(56) References Cited

U.S. PATENT DOCUMENTS 5,195,809 A * 3/1993 Burgdorf .............. B60T 8/4031
303/113.2
5,472,264 A 12/1995 Klein et al.
5,567,021 A * 10/1996 Gaillard .................. B60T 7/042
188/358

FOREIGN PATENT DOCUMENTS

CN 101242981 A 8/2008
CN 101327788 A 12/2008
(Continued)

OTHER PUBLICATIONS

Machine Translation of Japanese Patent Publication JP 2006281992.*
Machine Translation of Japanese Patent Publication JPH10264791.*

*Primary Examiner* — Michael Leslie
*Assistant Examiner* — Daniel Collins
(74) *Attorney, Agent, or Firm* — Norton Rose Fulbright US LLP; Gerard Messina

(57) ABSTRACT

A braking system, in particular for a motor vehicle, including a braking force device having a brake booster for boosting a braking force and a brake pressure supply device for providing brake pressure with the aid of a brake medium, a braking device which may be acted on by pressure by the brake medium with the aid of the brake pressure supply device, and at least one sensor which is designed to detect a distance differential of a displacement means for the displacement of a volume of the brake medium of the braking force device. The braking force device is designed to ascertain the volume of brake medium to be displaced on the basis of the detected distance differential.

18 Claims, 1 Drawing Sheet

(51) Int. Cl.
*B60T 1/10* (2006.01)
*B60T 8/48* (2006.01)
*B60T 13/66* (2006.01)
*B60T 13/74* (2006.01)

(52) U.S. Cl.
CPC .......... *B60T 13/662* (2013.01); *B60T 13/745* (2013.01); *B60T 2270/604* (2013.01)

(56) References Cited

FOREIGN PATENT DOCUMENTS

| | | |
|---|---|---|
| CN | 101815639 A | 8/2010 |
| DE | 19604134 A1 | 8/1997 |
| DE | 102007030441 | 1/2009 |
| DE | 102008000628 | 9/2009 |
| DE | 102008012874 | 9/2009 |
| JP | 60-92151 | 5/1985 |
| JP | 10-264791 | 10/1998 |
| JP | 2006-281992 | 10/2006 |
| JP | 2007-112426 | 5/2007 |
| JP | 2009-112106 | 5/2009 |
| JP | 2010-69689 | 4/2010 |
| JP | 2010-179742 | 8/2010 |
| WO | 2009112106 A1 | 9/2009 |
| WO | 2010069689 A1 | 6/2010 |

\* cited by examiner

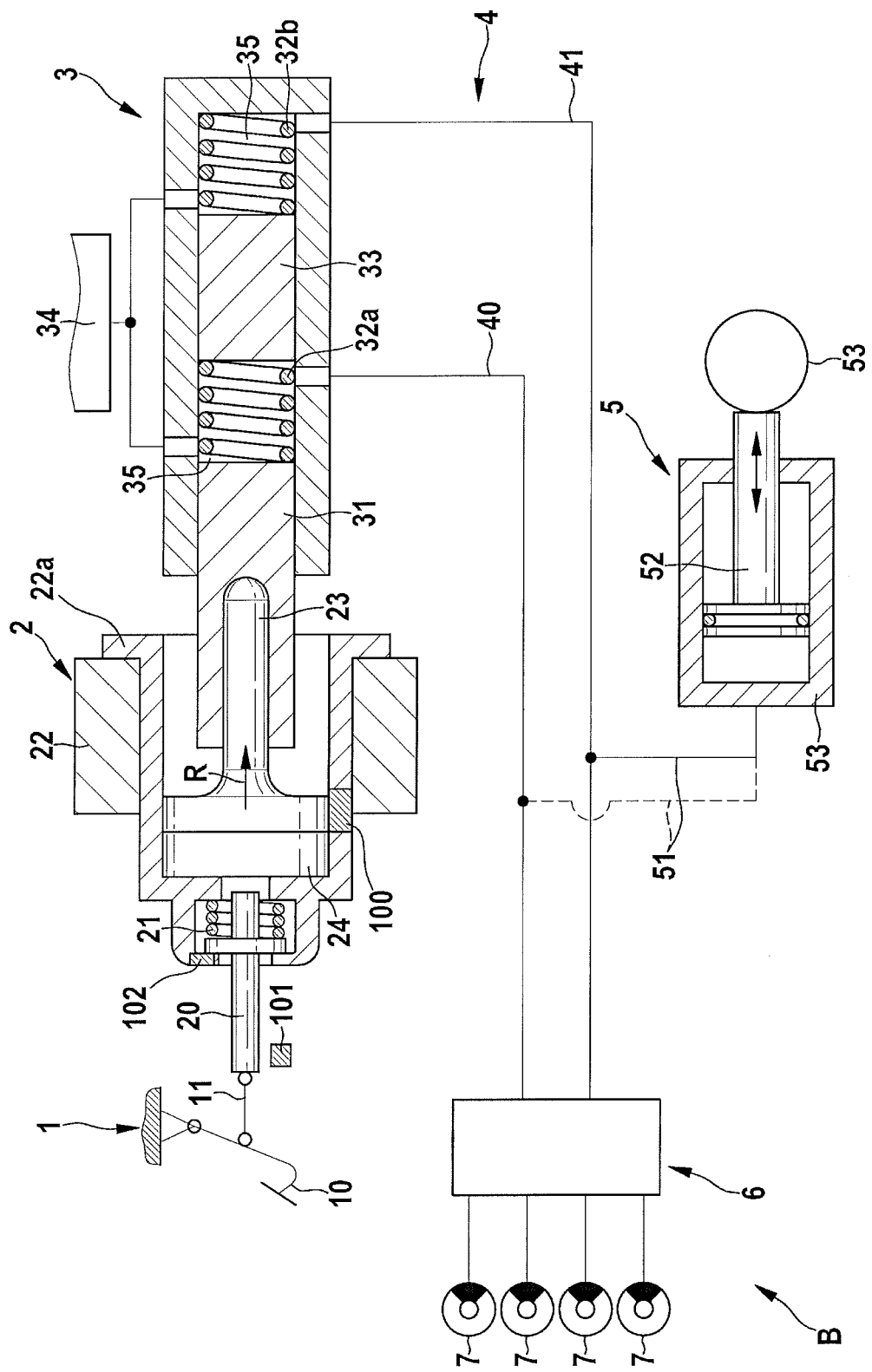

BRAKING SYSTEM AND METHOD FOR REGULATING A PRESSURE OF A BRAKE MEDIUM IN A BRAKING SYSTEM

FIELD OF THE INVENTION

The present invention relates to a braking system, in particular for a motor vehicle, and a method for regulating a pressure of a brake medium in a braking system.

BACKGROUND INFORMATION

Braking systems are used in the automotive field, for example, to decelerate a motor vehicle in a controlled manner. For this purpose, a brake pedal force is usually converted into a brake pressure, which is transmitted with the aid of a brake medium to wheel cylinders of the motor vehicle in order to actuate same.

A vehicle braking system is described in German Published Patent Application No. 10 2008 012 874. The vehicle braking system includes hydraulically actuatable wheel brake cylinders and a pressure supply system for acting on the wheel brakes with a brake pressure. When a driver of the motor vehicle actuates the vehicle braking system, the intensity of the driver braking input is ascertained. The volume of an expanding device is changed as a function of the ascertained driver braking input. The pressure supply system couples a brake pedal for transmitting the driver input and a brake booster to wheel brake cylinders of the vehicle. When the brake pedal is actuated, a master brake cylinder together with pistons of the pressure supply system, which is connected to the wheel brake cylinders via two brake circuits, is indirectly actuated. In addition, the brake booster includes an electric motor via which an assisting, i.e., additional, force is indirectly applied to the piston of the master brake cylinder. Since the piston of the master brake cylinder has a defined surface area, and is also coupled to the piston of the master brake cylinder in a defined manner, the position of the piston of the master brake cylinder may be deduced from the angular position of a drive shaft of the electric motor. The displaced volume of brake medium from the master brake cylinder may be ascertained based on this position.

SUMMARY

A braking system, in particular for a motor vehicle, including:
 a braking force device having a brake booster for boosting a braking force and a brake pressure supply device for providing brake pressure with the aid of a brake medium,
 a braking device which may be acted on by pressure by the brake medium with the aid of the brake pressure supply device, and
 at least one sensor which is designed to detect a distance differential of a displacement means for the displacement of the volume of the brake medium of the braking force device and,
 the braking force device being designed to ascertain the volume of brake medium to be displaced on the basis of the detected distance differential.

The sensor may detect the distance differential either directly or also merely indirectly, for example by detecting the time and speed for a displacement of the displacement means. Based on this information, the distance differential and in addition the volume to be displaced may then be ascertained.

A method for regulating a pressure of a brake medium in a braking system, in particular in a motor vehicle, which is preferably suited for carrying out using a device, including the following steps:
 specifying a braking force,
 boosting the braking force,
 providing the boosted braking force with the aid of brake pressure in a braking device by a volume displacement of the brake medium, the volume displacement of the brake medium being detected via a distance differential of a displacement means.

A use of a braking system in a motor vehicle, in particular in a passenger vehicle, is set forth here.

The braking system and the method of the present invention have the advantage that the volume of brake medium to be displaced for a desired brake pressure may be easily and reliably determined indirectly based on a distance differential of the displacement means.

According to one preferred refinement of the present invention, the at least one sensor is designed for detecting a position angle. In this way, for example, the sensor may be cost-effectively manufactured together with the corresponding angular position device, in particular in a motor or the like.

According to another preferred refinement of the present invention, at least one additional sensor is provided which is designed as a distance sensor or as a differential path sensor. The advantage realized is that reliability of the determination of the brake medium volume to be displaced is further increased, since the additional sensor on the one hand may be used to check the detected values of the at least one sensor, and on the other hand the volume of brake medium to be displaced may be determined in different ways, and tolerances may be minimized, for example by averaging.

According to another preferred refinement of the present invention, the braking force device is designed to compensate for a deformation of the units of the braking system due to a change in pressure of the brake medium. In this regard, the units are in particular the brake pressure supply device and the braking device. The reliability and accuracy of the braking system may thus be further increased, since deformations of the units, such as rubber seals or the like, are taken into account in the indirect ascertainment of the volume to be displaced. The desired brake pressure may thus be provided even more accurately, so that the driver of a motor vehicle may carry out a well-balanced braking operation.

According to one preferred refinement of the present invention, the braking force device, in particular the brake pressure supply device, includes an elastic element which is deformable when acted on by pressure. The controllability of the braking system may be greatly improved with the aid of the deformable element, for example in the form of a reaction disk or an elastic plate.

According to another preferred refinement of the present invention, the displacement means is designed as a piston, the brake pressure supply device is designed as a cylinder, and the braking force device is designed to ascertain the volume to be displaced on the basis of the cross-sectional area of the piston multiplied by the distance differential of the displacement of the piston. The advantage thus realized is that a simple and cost-effective displacement means and a corresponding brake pressure supply device are thus provided. At the same time, the volume to be displaced may be easily and accurately determined, since the surface area of the piston is precisely defined, and a distance differential may be reliably determined with the aid of known methods.

According to another preferred refinement of the present invention, a compensation means is provided for supplying and/or discharging brake medium volume to/from the braking device.

An elasticity of a braking system may be easily and reliably adjusted in this way, and in particular tolerances in the braking system may be compensated for.

According to another preferred refinement of the present invention, the compensation means is drivable with the aid of a motor. In this way, the compensation means may be easily controlled, and brake medium volume may be supplied or discharged in a controlled manner.

According to another preferred refinement of the present invention, the compensation means is designed in such a way that a volume of brake medium which is suppliable and/or dischargeable by the compensation means is less than a volume of brake medium displaced by the brake pressure supply device.

The advantage is that the situation is avoided in which the compensation means accommodates too much volume of the brake medium, resulting in an excessively steep drop in brake pressure.

According to one advantageous refinement of the method, when the brake pressure is provided with the aid of the volume displacement, a deformation of an elastic element due to a change in pressure is compensated for. More accurate and reliable provision of brake pressure with the aid of the brake medium is thus possible.

According to another advantageous refinement, a brake medium volume of the braking device is supplied and/or discharged by a compensation means. In this way an elasticity of the braking system may be easily and reliably adjusted, and in particular tolerances of the braking system may be compensated for.

According to another advantageous refinement, the brake medium volume supplied and/or discharged by the compensation means is less than or equal to the brake medium volume provided by the braking device. The advantage is that the situation is avoided in which the compensation means accommodates too much volume of the brake medium, resulting in an excessively steep drop in brake pressure.

BRIEF DESCRIPTION OF THE DRAWING

FIG. 1 shows a braking system according to one specific embodiment of the present invention.

DETAILED DESCRIPTION

Identical or functionally equivalent elements are denoted by the same reference numerals in the figures unless described otherwise.

FIG. 1 shows a braking system according to one specific embodiment of the present invention.

A braking system B is shown in FIG. 1. Braking system B includes a pedal unit 1 having a brake pedal 10 which is actuatable by a driver of a motor vehicle for braking. Brake pedal 10 is connected in a customary manner via a tappet 11 to an input rod 20 of a brake booster 2 for m transmitting the desired braking force. Input rod 20 is supported via springs 21 inside brake booster 2, more precisely, on projections of an entrainer 22a. Upon an appropriately strong actuation, input rod 20 presses on an elastic element in the form of a reaction disk 24. Elastic reaction disk 24 is further connected in a form-locked manner to a piston 23 for partial transmission of force, and indirectly transmits forces of brake pedal 10 to a brake pressure supply device in the form of a tandem brake cylinder 3, in that a portion of piston 23 of brake booster 2 engages in a form-locked manner with a portion of a piston 31 of tandem brake cylinder 31. A motor 22 for displacing entrainer 22a of brake booster 2 is situated on the outer side of brake booster 2, and provides an additional force on piston 23 of brake booster 2, for example via a thread or the like, for boosting the braking force.

Tandem brake cylinder 3 has a customary design: a second piston 33 is supported on the one hand on piston 31 via spring 32a, and on the other hand is supported inside the housing of tandem brake cylinder 3 via spring 32b, resulting in two separate chambers. Each of chambers 35 is connected to a shared reservoir 34 for providing brake medium. Each brake line 40, 41 is connected to a chamber 35 in each case. Brake lines 40, 41 of a braking device 4 are further connected downstream to an ABS/ESP unit 6. This unit is in turn connected to wheel brake cylinders 7. When a certain brake pressure is present, ABS/ESP unit 6 checks whether a wheel is possibly locked due to actuation of corresponding wheel brake cylinder 7. If this is the case, the ABS/ESP unit reduces the brake pressure at the appropriate wheel brake cylinder until the wheel in question is no longer locked. In addition, ABS-ESP unit 6 checks whether slipping is possibly present at one or multiple wheels. If this is the case, ABS/ESP unit 6 acts on the appropriate wheel brake cylinder with a brake pressure, so that the wheel in question is braked and no longer slips.

In addition, a compensation means 5 in the form of a compensation cylinder 53 having a piston 52 is provided. Piston 52 is drivable with the aid of a motor 53. The space in compensation cylinder 53 for accommodating brake medium, which is changeable in volume with the aid of piston 52, is connected to brake lines 40, 41 via lines 51. Lines 51 are situated on brake lines 40, 41 in the area between ABS/ESP unit 6 and chambers 35 of the tandem brake cylinder.

This type of braking system is used in regenerative braking systems, for example. When brake pedal 10 is actuated, pressure in the braking device is decreased by compensation means 5 via a volume displacement of brake medium in order to allow recovery of the braking force, for example with the aid of electric motors on the wheels which as a generator brake the particular wheels. To ascertain applied volume $V_{HZ}$ which is characteristic for the braking system, a path sensor 100 may be provided which measures a displacement of entrainer 22a. Such a measurement may, for example, also be carried out indirectly via a position angle of the drive shaft of the engine or the like. Based on ascertained distance $S_B$ of the displacement by path sensor 100 and cross-sectional area $A_{HZ}$ of piston 31 which may be acted on by the brake medium, applied volume $V_{HZ}$ may be computed: $V_{HZ}=A_{HZ}*S_B$.

Another option is to provide a rod displacement sensor 101 which measures a displacement of input rod 20, and a differential path sensor 102 which measures difference $S_D$ between distance $S_B$ of entrainer 22a and displacement $S_F$ of input rod 20. Displaced volume $V_{HZ}$ is then computed as follows: $V_{HZ}=A_{HZ}*(S_F-S_D)$. To take an elastic element (in FIG. 1, reaction disk 24) into account in computing the displaced volume, a spring constant C for the reaction disk may be assumed. Displaced volume $V_{HZ}$ is then computed according to the following formula: $V_{HZ}=A_{HZ}*(S_B-F_B/C)$. The displaced volume is thus appropriately reduced by the deformation of reaction disk 24 when acted on by pressure. To prevent an excessive volume of brake medium from being removed from the braking system by the compensation means, the particular accommodatable volume $V_A$ of the compensation means is less than or equal to the particular displaced volume: $V_{HZ} > V_A$. In this way, in particular air is prevented from entering the braking system.

Although the present invention has been described with reference to preferred exemplary embodiments, it is not limited thereto, and is modifiable in numerous ways.

The brake booster may be designed in the form of an electromechanical, electrohydraulic, or electropneumatic brake booster.

What is claimed is:

1. A braking system, comprising:
a braking force device having a brake booster for boosting a braking force and a brake pressure supply device for providing a brake pressure via a brake medium;
a braking device which may be acted on by pressure by the brake medium via the brake pressure supply device;
a displacement arrangement for displacing a volume of the brake medium; and
at least one sensor for detecting a distance differential of the displacement arrangement, wherein the braking force device ascertains the volume of the brake medium to be displaced on the basis of the detected distance differential; and
a compensation arrangement for at least one of supplying and discharging a volume of brake medium at least one of to and from the braking device as a function of the ascertained volume of the brake medium to be displaced.

2. The braking system as recited in claim 1, wherein the braking system is for a motor vehicle.

3. The braking system as recited in claim 1, wherein the at least one sensor detects a position angle.

4. The braking system as recited in claim 1, further comprising:
at least one additional sensor serving as one of a distance sensor and a differential path sensor.

5. The braking system as recited in claim 1, wherein the braking force device compensates for a deformation of units of the braking system due to a change in pressure of the brake medium.

6. The braking system as recited in claim 1, wherein one of the braking force device and the brake pressure supply device includes an elastic element which is deformable when acted on by pressure.

7. The braking system as recited in claim 1, wherein:
the displacement arrangement includes a piston,
the brake pressure supply device includes a cylinder, and
the braking force device ascertains the volume to be displaced on the basis of a cross-sectional area of the piston multiplied by the distance differential of a displacement of the piston.

8. The braking system as recited in claim 1, wherein the compensation arrangement is drivable with the aid of a motor.

9. The braking system as recited in claim 1, wherein the compensation arrangement is designed in such a way that the volume of brake medium which is at least one of supplied and discharged by the compensation arrangement is less than the ascertained volume of the brake medium to be displaced.

10. A method for regulating a pressure of a brake medium in a braking system, comprising:
specifying a braking force;
boosting the braking force;
providing the boosted braking force with the aid of brake pressure in a braking device by a volume displacement of the brake medium;
detecting the volume displacement of the brake medium via a distance differential of a displacement arrangement; and
actuating a compensation arrangement to at least one of supply and discharge a brake medium volume of the braking device, wherein the volume of the brake medium at least one of supplied and discharged by the compensation arrangement is a function of the detected volume.

11. The method as recited in claim 10, wherein the method is performed in a motor vehicle.

12. The method as recited in claim 10, further comprising:
providing the brake pressure with the aid of the volume displacement; and
compensating for a deformation of an elastic element due to a change in pressure.

13. The method as recited in claim 10, wherein the volume of brake medium supplied and/or discharged by the compensation arrangement is less than or equal to the detected volume.

14. A method of using a braking system that includes a braking force device having a brake booster for boosting a braking force and a brake pressure supply device for providing a brake pressure via a brake medium; a braking device which may be acted on by pressure by the brake medium via the brake pressure supply device; a displacement arrangement for displacing a volume of the brake medium; at least one sensor for detecting a distance differential of the displacement arrangement, wherein the braking force device ascertains the volume of the brake medium to be displaced on the basis of the detected distance differential, and a compensation arrangement for at least one of supplying and discharging brake medium volume at least one of to and from the braking device as a function of the ascertained volume of the brake medium to be displaced, the method comprising:
using the braking system in a passenger vehicle.

15. A braking system, comprising:
a braking force device having a brake booster for boosting a braking force and a brake pressure supply device for providing a brake pressure via a brake medium;
a braking device which may be acted on by pressure by the brake medium via the brake pressure supply device;
wherein the brake pressure supply device includes:
a displacement arrangement for displacing a volume of the brake medium,
an entrainer which is movable with the displacement arrangement for boosting a brake force, and
at least one sensor for measuring a displacement of the entrainer; and
wherein the braking force device ascertains the volume of the brake medium to be displaced on the basis of the measured displacement of the entrainer; and
at least one additional sensor serving as one of a distance sensor measuring a displacement of an input rod connected to a brake pedal, or a differential path sensor measuring a difference between a displacement of the entrainer and a displacement of the input rod; and
a compensation arrangement for at least one of supplying and discharging brake medium volume at least one of to and from the braking device as a function of the ascertained volume of the brake medium to be displaced.

16. The braking system as recited in claim 15, wherein the volume of brake medium volume at least one of supplied and discharged by the compensation arrangement is less than or equal to the ascertained volume of brake medium to be displaced by the braking force device.

17. The braking system as recited in claim 15, wherein the braking force device compensates for a deformation of units of the braking system due to a change in pressure of the brake medium.

18. The braking system as recited in claim 15, wherein one of the braking force device and the brake pressure supply device includes an elastic element which is deformable when acted on by pressure.

* * * * *